Oct. 2, 1923.

F. J. NAPOLITAN

OXYACETYLENE TORCH

Filed April 20, 1920

1,469,392

INVENTOR
F. J. Napolitan
BY
J. Chamberlain
ATTORNEY

Patented Oct. 2, 1923.

1,469,392

UNITED STATES PATENT OFFICE.

FRANCIS JOHN NAPOLITAN, OF SPRINGFIELD, MASSACHUSETTS, ASSIGNOR, BY MESNE ASSIGNMENTS, TO AIR REDUCTION COMPANY, INCORPORATED, OF NEW YORK, N. Y., A CORPORATION OF NEW YORK.

OXYACETYLENE TORCH.

Application filed April 20, 1920. Serial No. 375,194.

*To all whom it may concern:*

Be it known that I, FRANCIS JOHN NAPOLITAN, a citizen of the United States, and resident of Springfield, in the county of Hampden and State of Massachusetts, have invented certain new and useful Improvements Relating to Oxyacetylene Torches, of which the following is a specification.

The invention relates to oxyacetylene and like torches, such as are used for welding and cutting metals, and the object is to overcome or mitigate the difficulty of flashing-back, at the same time securing the advantage of thorough pre-mixing and obtaining general efficiency in the operation of the torch. The preferred form of torch construction and the novel method of controlling the gases which is involved will now be briefly described, it being understood that numerous other forms may be devised.

In the accompanying drawings, forming a part hereof:

Figure 1:
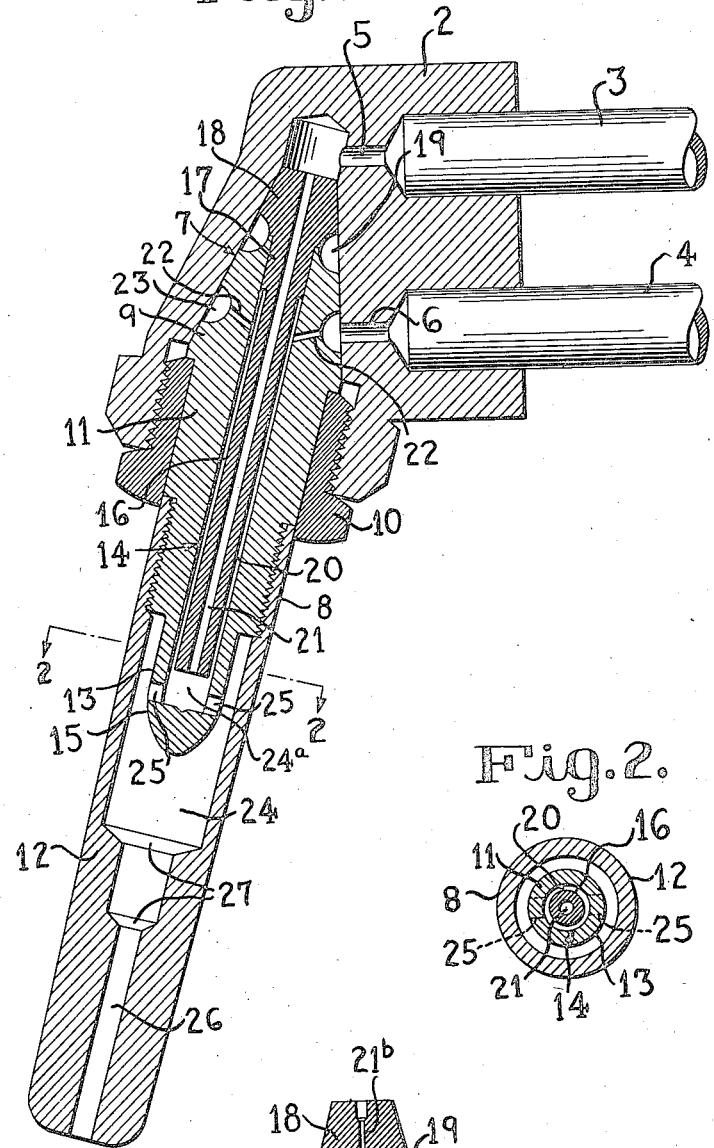
Fig. 1 is a section taken in the plane of the axes through the head and tip of a welding torch of the interchangeable sealed, mixing tip variety, to which the invention more particularly relates.
Figure 2:
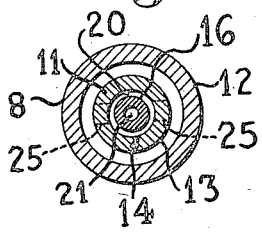
Fig. 2 is a cross-section on the line 2—2 of Fig. 1.

The permanent part of the torch comprises a block or head 2 and pipes 3, 4 forming supply conduits for the oxygen and acetylene (acetylene being the typical combustible gas for these torches). These conduits are suitably valved at the rear end of the handle (not shown), and in use are connected by flexible hose with sources of supply and with pressure regulators whereby the gases are delivered to the torch under predetermined pressures, which vary when different sizes of tips are used in the head. The supply conduits terminate in channels 5, 6 in the head, opening, respectively, into the rear end and side of a conical ground socket 7. The removable tip 8 has a corresponding truncated conical rear portion 9 adapted for sealing contact with the head under the pressure of a screw or nut 10, this being the preferred form of seal, though others are known. It will be understood that the tip forms one of a series differently proportioned with respect to the size of flame to be delivered, and each adapted to fit the socket in the head. The invention has to do more particularly with the tip.

In the particular preferred embodiment illustrated the tip is made of several pieces permanently or semi-permanently secured together as a unit. One piece 11 is a block having the major part of the conical male member of the seal formed thereon. Said piece is provided with screw-threads intermediate its ends to receive a forward piece 12, and in front of said threads is reduced to form what may be termed an internal nozzle 13. An axial opening 14 of relatively large diameter extends forward from the rear extremity of the piece 11 for a substantial distance, terminating behind the forward end 15 of the nozzle 13, which is a closed wall. An elongated tubular piece 16 is inserted into said opening 14 from the rear, where it may be held by a driving fit between the wall of the opening and a plug portion 17 of the tube, which closes the rear end of the opening. The rear end 18 of the inserted piece, enlarged and shouldered to fit against the rear end of the piece 11, may form part of the conical sealing member of the tip, an annular groove 19 being preferably provided at the junction to improve the seal. All the part of the inserted piece in advance of the plug portion 17 is of reduced diameter, so as to leave a longitudinal passage 20 of annular cross-section between it and the side of the opening 14.

The bore 21 of the tube 16 forms an inlet and longitudinal conduit in the tip for one of the gases, namely the oxygen. The area of this bore varies in the different sizes of tips, and is determined for each tip in accordance with the oxygen gage pressure to be employed, so as to pass the requisite amount of oxygen for the flame, the bore thus constituting an elongated metering port. The acetylene is metered through ports 22 leading laterally inward from a circumferential groove 23 in the sealing surface to the rear portion of the annular longitudinal passage or conduit 20. There may be one or more of these ports, though a plurality is preferable, and their total effective area is determined with reference to the selected acetylene gage pressure to pass acetylene at the proper rate for the particular tip.

The two longitudinal passages 20 and 21 extend forward to a point relatively remote from the inlets, at which point their forward ends are in communication with each other and with an enlarged expansion and mixing chamber 24 formed by hollowing out the rear part of the piece 12 to a shell. The nozzle 13, containing the forward portions of the separate gas passages, projects into the chamber from the rear, the side of the nozzle being spaced substantially from the side of the chamber. The open forward end of the tube 16 is near the closed end 15 of the nozzle, and from the space or preliminary mixing chamber 24$^a$ directly behind this wall the gases find exit to the main chamber through ample lateral ports 25 in the nozzle. These ports 25 are preferably radial and either two or a multiple of two in number, arranged at diametrically opposite points.

The gases hitherto walled apart are thus brought together, sharply baffled, and expanded, in such manner as to mix them suddenly and thoroughly. This mixture fills the chamber 24, which is so located as to constitute an explosion chamber in event of a backfire. While the construction illustrated is preferred as most advantageous, other forms of the conduits and of the means at their forward ends for baffling the gases and permitting them to escape into the expansion and mixing chamber may be employed. In practice it is quite important to baffle the gases and deliver them into said chamber at a point intermediate its ends, and substantially forward of its rear end, as is done in the form shown in the drawing. The rounding or streamlining of the font end of the internal nozzle is desirable to prevent the formation of voids in the explosion chamber which might favor the lodgment of a backfire.

The forward, comparatively solid part of the piece 12 of the tip is drilled axially with a flame bore 26, preferably parallel-sided and of sufficient length to straighten out the lines of the stream before it emerges into the atmosphere, but not overlong so as to create a possibility of a backfire coming to rest therein and not reaching the explosion chamber. The flame bore is made of the proper diameter for the size of flame for which the tip is designed, and of course varies in different tips of a series. In any event it is much smaller than the explosion chamber, the greater diameter of which is preferably reduced to that of the flame bore by a plurality of abrupt steps 27.

Both gases are supplied under positive pressures, sufficient to force them through the ports and passages in proper quantities and relative proportions for the flame to be maintained. For safety it is desirable that the oxygen gage pressure materially exceed that of the acetylene. Because the separate gas passages can be relatively large without possibility of backward propagation of flame therein, the pressures can be relatively low. The gases after flowing separately for a considerable distance are suddenly mixed and caused to fill the explosion chamber, as stated, from which chamber they issue through the bore 26 and are delivered as a flame jet. The gases of this jet are thoroughly premixed, and the flame is of the best character. With perfect premixing, striking back of the flame in the highly explosive mixture may occur if the normal working conditions are unduly disturbed; but in that event the combustion is immediately communicated to the enlarged chamber, where the explosion of the body of gas liberates sufficient energy to check the flow in the separate gas passages, thus cutting off the supply for the combustion, which therefore instantly ceases. Owing to the fact that the gases are mixed suddenly, and preferably directly upon meeting, a region of potential equilibrium where a backfire might continue to burn within the tip is avoided. A backfire is, thus, only momentary and without ill effects, and is immediately followed by a resumption of the normal flow. As multiple jet tips are known, the invention is not necessarily confined to a single flame bore; and it will be understood that in case of a plurality of bores their aggregate effective area would be restricted as compared with the capacity of the explosion chamber.

Figure 3:
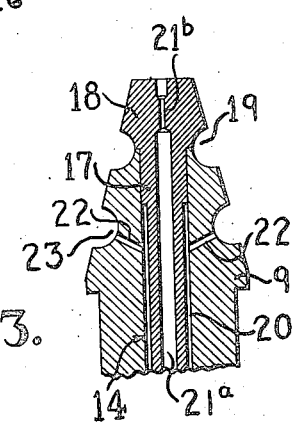
Fig. 3 is an axial section through the rear portion of a slightly modified tip.

Fig. 3 illustrates the fact that the central oxygen passage, here marked 21$^a$, may have a short constriction 21$^b$ at the rear end forming the oxygen metering port.

What I claim as new is:

1. An interchangeable tip for oxyacetylene and like torches having a rear portion formed for sealing contact with the part of the torch containing the supply conduits, separate inlets in said rear portion for the two gases, separate longitudinal passages extending forward in the tip from the respective inlets, an enlarged chamber with which the forward ends of said passages communicate, means in said chamber for baffling the gases, and a relatively restricted flame exit.

2. An interchangeable tip for oxyacetylene and like torches having a rear portion formed for sealing contact with the part of the torch containing the supply conduits, separate inlets in said rear portion for the two gases, separate longitudinal passages extending forward in the tip from the respective inlets and having their forward ends adjacent, a baffle at the ends of the passages, an explosion chamber into which the baffled gases expand, and a relatively restricted flame exit.

3. An interchangeable tip for oxyacetylene and like torches having a rear portion formed for sealing contact with the part of the torch containing the supply conduits, separate inlets in said rear portion for the two gases, separate longitudinal passages extending forward in the tip from the respective inlets, an enlarged chamber with a relatively restricted flame exit therefrom, and means whereby the gases at the forward ends of said separate passages are brought together, baffled and delivered into the enlarged chamber intermediate the ends of the latter.

4. An interchangeable tip for oxyacetylene and like torches having a rear portion formed for sealing contact with the part of the torch containing the supply conduits, separate inlets in said rear portion for the two gases, separate longitudinal passages extending forward in the tip from the respective inlets, an enlarged mixing chamber, said passages being arranged one within the other and projecting forwardly into said chamber, and baffling means at the ends of said passages.

5. An interchangeable tip for oxyacetylene and like torches having a rear portion formed for sealing contact with the part of the torch containing the supply conduits, separate inlets in said rear portion for the two gases, separate longitudinal passages extending forward in the tip from the respective inlets, and an enlarged mixing chamber, said passages being arranged one within the other and projecting forwardly into said chamber, the outer passage being closed at the end and having lateral outlet to the mixing chamber.

6. An interchangeable tip for oxyacetylene and like torches having a longitudinal opening of relatively large diameter extending forward from its rear extremity and provided with inlets for one kind of gas, a tubular piece inserted into said longitudinal opening, whereby two longitudinal passages are formed, one within the other, an enlarged mixing chamber in the intermediate part of the tip, and an internal nozzle containing the ends of said passages projecting forward into said chamber, spaced from the sides thereof and having baffled exit thereto.

7. An oxyacetylene or like torch of the positive pressure type having means providing separate longitudinal passages for the two gases, one passage being within the other, an enlarged mixing and explosion chamber into which the gases from said passages expand, a relatively restricted flame exit from said explosion chamber, and a baffle in the path of the separate gases compelling their sudden commingling.

8. An oxyacetylene or like torch of the positive pressure type having means providing separate longitudinal passages for the two gases, one passage being within the other, an enlarged mixing and explosion chamber with relatively restricted flame exit therefrom, an internal nozzle projecting into said chamber to deliver the gases from said passages into the chamber forward of its rear end, and a baffle at the end of said nozzle.

9. An oxyacetylene or like torch of the positive pressure type having means providing separate longitudinal passages for the two gases, one passage being within the other, an enlarged mixing and explosion chamber with relatively restricted flame exit therefrom, and an internal nozzle in continuation with the wall of the outer passage projecting into said chamber and having a closed forward end and lateral outlets.

10. An oxyacetylene or like torch of the positive pressure type having means providing separate longitudinal passages for the two gases, an enlarged mixing and explosion chamber with a relatively restricted flame exit therefrom and a baffle adjacent the ends of said passages, whereby the gases are brought separately to a point of commingling and there suddenly mixed and expanded to produce a body of explosive mixture accessible to a backfire from the flame exit.

11. An oxyacetylene or like torch of the positive pressure type having an enlarged mixing and explosion chamber with restricted flame exit therefrom, means comprising separate adjacent passages and a baffle for conducting the two gases longitudinally and causing them to expand, and to be suddenly commingled, in said chamber, intermediate the ends thereof.

FRANCIS JOHN NAPOLITAN.